United States Patent
Huntley

[11] 4,012,633
[45] Mar. 15, 1977

[54] WIDE DYNAMIC RANGE ANALOG SIGNAL OPTICAL COMMUNICATION SYSTEM

[75] Inventor: William P. Huntley, Old Lyme, Conn.

[73] Assignee: The United States of America as represented by the Secretary of the Navy, Washington, D.C.

[22] Filed: Sept. 5, 1975

[21] Appl. No.: 610,582

[52] U.S. Cl. .............................. 250/199; 340/189 R
[51] Int. Cl.² ............................................. H04B 9/00
[58] Field of Search ............... 250/199; 324/96, 97; 340/189 R

[56] References Cited
UNITED STATES PATENTS

| | | | |
|---|---|---|---|
| 3,284,633 | 11/1966 | Hathaway | 250/199 |
| 3,488,586 | 1/1970 | Watrous et al. | 250/199 |
| 3,927,316 | 12/1975 | Citta | 250/199 |
| 3,928,760 | 12/1975 | Isoda | 250/199 |

Primary Examiner—Robert L. Griffin
Assistant Examiner—Michael A. Masinick
Attorney, Agent, or Firm—Richard S. Sciascia; Arthur A. McGill; Prithvi C. Lall

[57] ABSTRACT

A system for transmitting low level analog signals wherein the analog signals are converted into frequency modulated light amplitudes which are transmitted by means of an inexpensive fiber optic bundle, and the transmitted modulated light is demodulated at the receiving end to obtain an exact replica of the input signals. The system enables one to maintain a large amplitude dynamic range using an inexpensive phototransistor.

6 Claims, 2 Drawing Figures

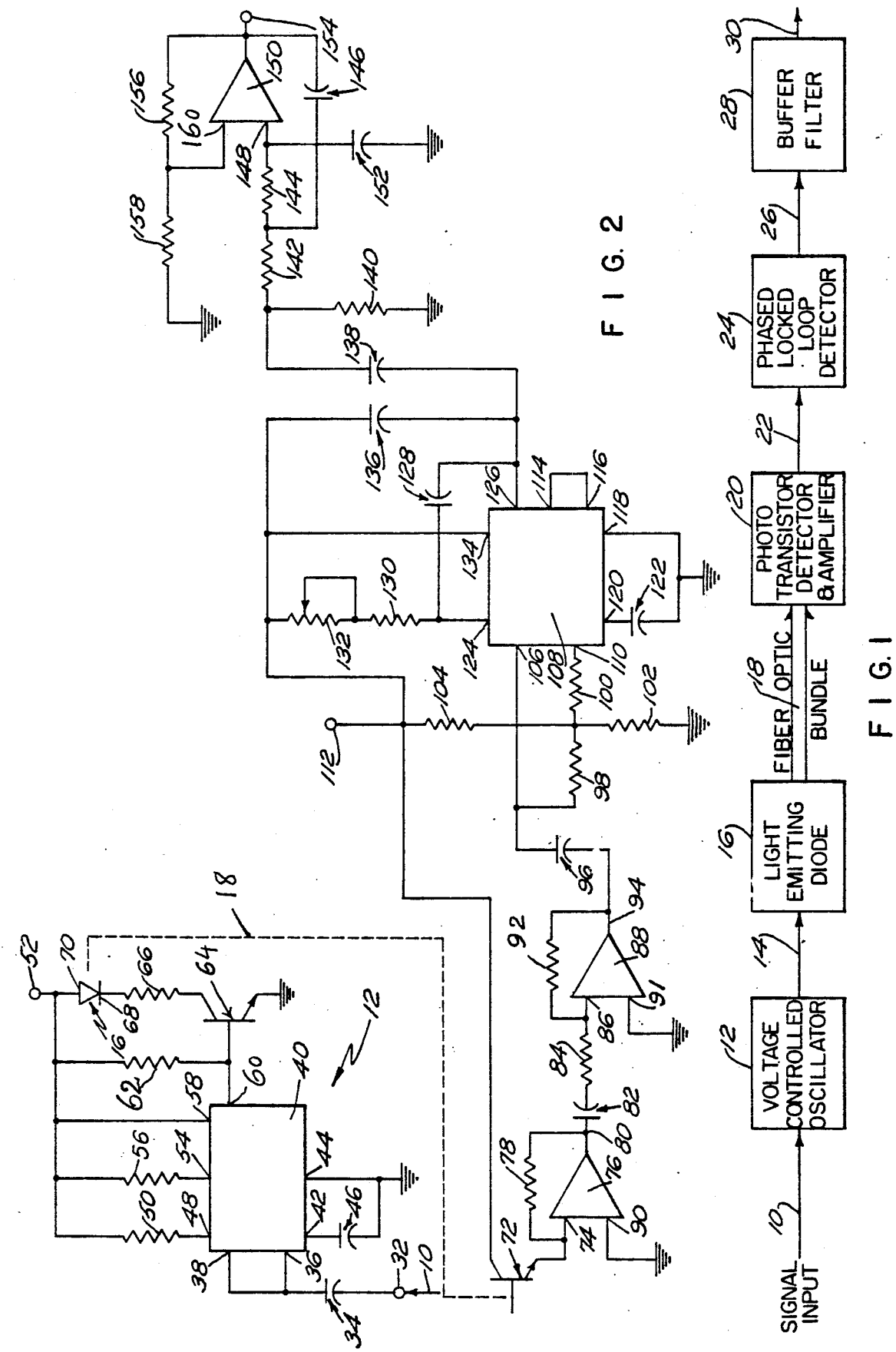

WIDE DYNAMIC RANGE ANALOG SIGNAL OPTICAL COMMUNICATION SYSTEM

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

This invention relates to processing of electrical signals and more particularly to a system for transmitting low level analog signals wherein the analog signals are converted into frequency modulated light which is transmitted by means of a fiber optic bundle and the transmitted modulated light is demodulated to obtain an exact replica of the input electrical signals.

Sending of electrical signals over long lengths of wire requires bulky cables that are subjected to electro-magnetic radiation. The interference caused by electromagnetic radiation is particularly significant in case of low level signal transmission. Old methods of low signal levels optical communication use expensive components, high voltage detectors, amplitude modulation (AM) techniques and some consume large amounts of power for useful optical links. Furthermore, most of the work in fiber optic communication has involved transmission of high frequency digital signals with a very limited amplitude dynamic range. It is thus desirable to have an optical communication system for transmission of low level electrical analog signals over an optical path which consumes a very small amount of power, uses inexpensive electronic components and has a wide dynamic range.

SUMMARY OF THE INVENTION

The object and advantages of the present invention are accomplished by utilizing an electro-optical communication system which includes a frequency modulator and a photo-diode for converting incoming electrical signals into frequency modulated light signals which are transmitted either by a fiber optic bundle or through air. The modulated light signals are allowed to fall on the photo-transistor to convert the optical signals back to electrical signals. The frequency modulated electrical signals so obtained are amplified in order to compensate for the attenuation thereof during transmission through fiber optic bundle or otherwise. The amplified frequency modulated electrical signals are then demodulated and passed through filtering circuits in order to obtain an exact replica of the analog electrical signals which were to be transmitted through the electro-optical transmission system.

An object of this invention is to transmit low level analog electrical signals through an electro-optical system over a wide dynamic range.

Another object of this invention is to have an electro-optical transmission system which used inexpensive light emitting diodes and photo-transistors.

Still another object of this invention is to have an electro-optical transmission system which uses frequency modulation.

Other objects, advantages, and novel features of the invention will become apparent from the following detailed description of the drawings when considered in conjunction with the accompanying drawings wherein:

BRIEF DESCRIPTION OF THE DRAWINGS

FIG. 1 is a block diagram of the electro-optical transmission system showing a preferred embodiment of subject invention; and FIG. 2 illustrates an electro-optical transmission system circuit constructed in accordance with the teachings of the present invention.

DESCRIPTION OF A PREFERRED EMBODIMENT

Referring to the drawings wherein like reference characters designate like parts throughout the several figures, and more particularly to FIG. 1 thereof, an electro-optical transmission system according to the teachings of subject invention is shown. Input signal represented by arrow 10 is frequency modulated by voltage controlled oscillator (VCO) 12 and the modulated electrical signal represented by arrow 14 is converted into a light signal by means of light emitting diode 16. The light signal so produced is transmitted by means of a fiber optic bundle 18 and is made to energize a photo-transistor which is a part of photo-transistor detector and amplifier unit 20. The output of unit 20, a frequency modulated and amplified electrical signal which is represented by arrow 22, is demodulated by a phase locked loop detector 24. The output of detector 24, represented by arrow 26, is filtered by buffer filter 28 which gives an output represented by arrow 30 which is a replica of the input signal indicated by arrow 10.

As shown in FIG. 2, input electrical signal represented by arrow 10 is applied at terminal 32 which is connected to one end of a blocking capacitor 34 which has its other end connected to terminals 36 and 38 of a waveform generator 40. Waveform generator 40 is connected as a voltage controlled oscillator (VCO) with a square wave output. As a way of example waveform generator 40 is preferably INTERSIL 8038 BC integrated circuit or an equivalent thereof. Terminals 42 and 44 of waveform generator 40 are connected to one another through capacitor 46 and terminal 44 is connected to ground as well. Terminal 48 of generator 40 is connected through resistor 50 to terminal 52. Terminal 54 of waveform generator 40 is connected through resistor 56 to terminal 52. Terminal 58 of generator 40 is connected to terminal 52. Terminal 60 of generator 40 is connected through resistor 62 to terminal 52. Terminal 60 is also connected to the base terminal of transistor 64. The emitter terminal of transistor 64 is connected to ground and the collector terminal of transistor 64 is connected through resistor 66 to cathode terminal 68 of light emitting diode 16 which has its anode terminal 70 connected to terminal 52. The output signal of light emitting diode 16 is transmitted through optical bundle 18 so as to energize the photo-transistor 72 by allowing the light to shine upon the base terminal of photo-transistor 72. The emitter terminal of photo-transistor 72 is also connected to terminal 74 of amplifier 76. Terminal 74 of amplifier 76 is also connected through resistor 78 to the output terminal 80 of amplifier 76. Terminal 80 is also connected to one end of capacitor 82 which has its other end connected through resistor 84 to terminal 86 of another amplifier 88. Terminal 90 of amplifier 76 is connected to ground. Terminal 86 of amplifier 88 is also connected through resistor 92 to the output terminal 94. Terminal 94 is also connected through capacitor 96 to one end of resistor 98. Terminal 91 of amplifier 88 is connected to ground. The second end of resistor 98 is connected to one end of resistor 100, one end of resistor 102 and one end of resistor 104. The terminal common to capacitor 96 and resistor 98 is connected to pin 106 of phase lock loop integrated circuit 108. The other end of resistor 100 is connected to pin 110 of phase locked loop circuit 108. The second terminal of resistor 102 is connected to ground and the second terminal of resistor 104 is connected to terminal 112 to which a voltage of +V is applied from a conventional DC voltage source. Pins 114 and 116 are interconnected. Pin 118 is connected to ground and is also connected to pin 120 through capacitor 122. Pin 124 of circuit 108 is connected to pin 126 through a capacitor 128 and is also connected to resistor 130 the other end of which is connected to variable resistor 132 and to terminal 112. Terminal 112 is also connected to terminal 134 and through capacitor 136 to terminal 126. Terminal 126 of circuit 108 is connected to one end of capacitor 138 and the other end of a capacitor 138 is connected to ground through resistor 140 and also connected to one end of resistor 142. The other end of resistor 142 is connected to one end of resistor 144 and to one end of capacitor 146. The other end of resistor 144 is connected to terminal 148 of amplifier 150 and also connected to ground through capacitor 152. The other end of capacitor 146 is connected to output terminal 154 of amplifier 150. The output terminal 154 is connected to one end of resistor 156. The other end of resistor 156 is connected to pin 160 of amplifier 150 and to one end of resistor 158. The other end of resistor 158 is connected to ground.

The operation of the electro-optical system will be described with reference to FIGS. 1 and 2. Low level analog electrical signals are applied at terminal 32 to be applied to terminal 38 of voltage controlled oscillator (VCO) 12. Capacitor 34 acts as a blocking capacitor to filter out any DC components therein. The values of resistors 50, 56 and capacitor 46 are selected so as to provide a central frequency for the VCO 12. As an example, the values of the resistors 50 and 56 and capacitor 46 were selected so as to produce a center frequency of 48.7 kilohertz for the circuit 40. Power supply terminal 52 is directly connected to terminal 58 of integrated circuit waveform generator 40 so as to provide proper biasing thereof. The output of waveform generator 40 appears on terminal 60 thereof in the form of a square wave pulse. Transistor 64 acts as an off and on switch. Resistor 66 is in series with transistor 64 and light emitting diode 16 in order to act as a current limiter to the lighting diode 16. Thus with no electrical signal applied to the input terminal 38, the output of integrated circuit 40 appears in the form of a square wave which results in an optical output of alternating amplitude having the frequency of the carrier frequency generated by the wave form generator. However due to the low level analog electrical signals applied at terminal 32, the frequency of amplitude variation of the output of the light emitting diode is modulated. Transistor 72 converts these optical signals to the electrical signals. Thus frequency modulated electrical signals are then applied to pin 74 of amplifier 76 which is preferably an amplifier circuit similar to Motorola device MC1488CP1, an 8 pin device which includes two parts 76 and 88 as shown in FIG. 2. Gain of amplifier 76 is set by resistor 78 and the output of amplifier 76 is applied to the input terminal of amplifier 88 whose gain is set by resistor 92 as shown in the figure.

The frequency modulated electrical signal after amplification through amplifiers 76 and 88, is then applied to pin 106 of phase locked loop integrated circuit 108. Capacitor 96 acts as a blocking capacitor to filter out any DC component in the electrical signal applied at pin 106. The resistor network arrangement including resistors 98, 100, 102 and 104 provides a biasing arrangement for integrated circuit 108. Resistors 130, 132 and capacitor 122 are chosen to provide the center frequency for the integrated circuit 108 which corresponds to the center frequency of integrated circuit 40. Capacitor 128 is used to prevent any oscillation in the phase locked loop circuit. And capacitor 136 is used as a low pass filter in the phase lock loop. The output of integrated circuit 108 corresponds to the input low level analog electrical signals. The output of integrated circuit 108 is applied through blocking capacitor 138 to the input terminal 148 of amplifier 150 which is similar to amplifiers 76 and 88. Resistors 156 and 158 set up the gain of the amplifier 150 and resistors 142 and 144 and capacitors 146 and 152 determine the frequency response of the active buffer filter 28. The output of amplifier 150 appearing at terminal 154 thereof is thus a replica of the input electrical signal which is transported from input terminal 32 to output terminal 60 of integrated circuit 40 to output terminal 154 of amplifier 150.

Briefly stated, when a low level analog electrical signal is applied to terminal 32, a frequency modulated electrical signal appears at the output terminal 60 of voltage control oscillator 12 which is changed to a frequency modulated light amplitude variations which are used to energize photo-transistor 72 so as to obtain a corresponding frequency modulated electrical signal which is amplified by amplifiers 76 and 88. The amplified and frequency modulated analog electrical signal is then demodulated by a phase locked loop integrated circuit 108 so as to obtain an electrical analog signal corresponding to the input analog electrical signal. The output of phase lock loop integrated circuit 108 is filtered by passive filter, a capacitor 136 and active filter 28. The output of active filter 28 thus gives rise to a signal at the receiving end which is a replica of the input low level analog electrical signal.

As pointed out earlier voltage control oscillator circuit 12 comprises an eight pin waveform generator, which is an integrated circuit such as INTERSIL 8038 BBC. Amplifiers 76 and 88 are the two sections of Motorola device MC1488CP1 and phase lock loop integrated circuit is SIGNETICS NE565A and an amplifier 150 is again Motorola device MC1458CP1. However, it should be clearly pointed out that these electrical components are recited just by way of examples and they can be replaced by equivalent electrical components without deviating from the teachings of subject invention.

Obviously many modifications and variations of the present invention are possible in the light of the above teachings. As an example the electrical components such as waveform generator integrated circuit, the amplifiers and the phase lock loop integrated circuit can be replaced by some equivalent circuits. Furthermore, the values of center frequencies, both for wave form generator as well as for phase lock loop integrated circuit used as demodulator, can be changed without deviating from the teachings of this invention. It is therefore understood that within the scope of the ap-

I claim:

1. A communication system for transmitting low level analog electrical signals over a wide dynamic range which comprises:
   a wave form generator for producing a preselected carrier frequency to be modulated by the input low level analog signals and thus forming an output of modulated electrical signals;
   light emitting diode means for converting the modulated electrical output of said waveform generator into a corresponding optical output, said light emitting diode being connected so as to use the output of said waveform generator as the input thereof;
   transmitting means for transmitting the optical output of said light emitting diode means, said transmitting means being so connected as to use the optical output of said light emitting diode means as an input at a first end thereof and giving an output at a second end thereof;
   phototransistor means for converting the transmitted optical output of said light emitting diode into a corresponding modulated electrical output, said phototransistor means being so connected to said transmitting means as to use the output at the second end of the said transmitting means as an input thereof;
   amplifying means for amplifying the modulated electrical output of said phototransistor means, said amplifying means being so connected to said phototransistor means as to use the modulated electrical output of said phototransistor means as an input thereof; and
   a phase locked loop demodulating means for demodulating the output of said amplifying means to obtain a replica of the low level analog electrical signals to be transmitted, said demodulating means being so connected to said amplifying means as to use the output of said amplifying means as an input thereof.

2. The communication system of claim 1 wherein said waveform generator includes a voltage controlled oscillator.

3. The communication system of claim 1 wherein said means for transmitting the optical output of said light emitting diode means comprises a fiber optic bundle.

4. The communication system of claim 2 wherein said phase locked loop demodulating means further includes means for providing a center frequency identical to the preselected frequency of said waveform generator.

5. The communication system of claim 4 wherein said phase locked loop demodulating means further includes passive filtering means.

6. The communication system of claim 5 wherein said phase locked loop demodulating means further comprises active filtering means.

* * * * *